(12) United States Patent
Park et al.

(10) Patent No.: US 9,042,928 B2
(45) Date of Patent: May 26, 2015

(54) APPARATUS AND METHOD FOR OPERATING MULTIPLE BEAMFORMING TRANSCEIVER IN WIRELESS COMMUNICATION SYSTEM

(71) Applicant: Samsung Electronics Co. Ltd., Suwon-si, Gyeonggi-do (KR)

(72) Inventors: Jeong-Ho Park, Seoul (KR); Su-Ryong Jeong, Yongin-si (KR); Ji-Yun Seol, Seongnam-si (KR); Hyun-Kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 13/622,116

(22) Filed: Sep. 18, 2012

(65) Prior Publication Data

US 2013/0072247 A1 Mar. 21, 2013

(30) Foreign Application Priority Data

Sep. 19, 2011 (KR) ........................ 10-2011-0093845

(51) Int. Cl.
*H04W 72/06* (2009.01)
*H04B 7/04* (2006.01)
*H04W 16/28* (2009.01)
*H04W 84/04* (2009.01)
*H04B 7/06* (2006.01)
*H04B 7/10* (2006.01)

(52) U.S. Cl.
CPC ............. *H04B 7/0408* (2013.01); *H04W 16/28* (2013.01); *H04W 84/045* (2013.01); *H04B 7/0632* (2013.01); *H04B 7/10* (2013.01)

(58) Field of Classification Search
CPC ........ H04B 7/048; H04B 7/0632; H04B 7/10; H04B 7/0491; H04B 7/0495; H04W 16/28; H04W 16/02; H04W 16/04; H04W 16/12; H04W 16/14; H04W 84/045; H04W 72/00; H04W 76/00; H04W 88/00
USPC ............... 455/513, 562.1, 450, 63.1, 522, 69, 455/446, 25, 129, 272, 561, 277.1, 277.2, 455/449, 7, 67.11; 370/252, 329, 328, 394, 370/468; 343/891, 368; 342/174, 442, 360, 342/369
See application file for complete search history.

(56) References Cited

U.S. PATENT DOCUMENTS 6,188,914 B1 * 2/2001 Chheda .................... 455/562.1
6,311,075 B1 * 10/2001 Bevan et al. ............... 455/562.1
6,778,130 B1 * 8/2004 Bevan et al. .................. 342/174

(Continued)

FOREIGN PATENT DOCUMENTS

JP 2008-236018 A 10/2008
JP 2009-253910 A 10/2009

(Continued)

*Primary Examiner* — Tan Trinh
(74) *Attorney, Agent, or Firm* — Jefferson IP Law, LLP

(57) ABSTRACT

A method for operating a base station in a wireless communication system in order to support a plurality of characteristics is provided. The method includes allocating resource periods for respective characteristics, transmitting system information including information on the characteristics, transmitting a reference signal with the characteristic corresponding to the relevant resource period through at least one of the resource periods, and receiving feedback information determining channel qualities for all of the characteristics.

50 Claims, 11 Drawing Sheets

(56) References Cited

U.S. PATENT DOCUMENTS

| | | | |
|---|---|---|---|
| 8,811,218 B2 * | 8/2014 | Kim et al. | 370/252 |
| 2004/0157645 A1 * | 8/2004 | Smith et al. | 455/562.1 |
| 2008/0175195 A1 | 7/2008 | Cho et al. | |
| 2008/0225788 A1 * | 9/2008 | Inoue et al. | 370/329 |
| 2008/0232307 A1 * | 9/2008 | Pi et al. | 370/328 |
| 2008/0232308 A1 * | 9/2008 | Dehner et al. | 370/329 |
| 2010/0177722 A1 * | 7/2010 | Guvenc | 370/329 |
| 2011/0244786 A1 * | 10/2011 | Fujii et al. | 455/7 |
| 2013/0010619 A1 * | 1/2013 | Fong et al. | 370/252 |
| 2013/0010964 A1 * | 1/2013 | Fong et al. | 380/277 |
| 2013/0016841 A1 * | 1/2013 | Fong et al. | 380/287 |
| 2013/0044713 A1 * | 2/2013 | Suh et al. | 370/329 |
| 2013/0242932 A1 * | 9/2013 | Tiirola et al. | 370/329 |
| 2013/0272259 A1 * | 10/2013 | Kim et al. | 370/329 |
| 2014/0003381 A1 * | 1/2014 | Lee et al. | 370/329 |

FOREIGN PATENT DOCUMENTS

| | | |
|---|---|---|
| KR | 10-2008-0065890 A | 7/2008 |
| WO | 2010-060683 A1 | 6/2010 |

* cited by examiner

APPARATUS AND METHOD FOR OPERATING MULTIPLE BEAMFORMING TRANSCEIVER IN WIRELESS COMMUNICATION SYSTEM

PRIORITY

This application claims the benefit under 35 U.S.C. §119 (a) of a Korean patent application filed on Sep. 19, 2011 in the Korean Intellectual Property Office and assigned Serial No. 10-2011-0093845, the entire disclosure of which is hereby incorporated by reference.

BACKGROUND OF THE INVENTION

1. Field of the Invention

The present invention relates to a wireless communication system.

2. Description of the Related Art

In order to satisfy an increasing demand for wireless data traffic, wireless communication systems are developing to support a higher data transmission rate. The 4th Generation (4G) system, which is starting to be commercialized, has been developed mainly to improve spectral efficiency in order to increase a data transmission rate. However, it has become difficult to satisfy an explosively-increasing demand for wireless data traffic solely by the spectral efficiency improvement technology.

As a scheme for addressing the above problem, there is a scheme for using a very wide frequency band. A frequency band used in the current mobile cellular system is generally lower than 10 GHz, and it is very difficult to secure a wide frequency band. There is therefore a need to secure broadband frequencies in a higher frequency band. However, as an operation frequency band for wireless communication becomes higher, a propagation path loss increases. Thus, a wave propagation distance decreases, and a service coverage area decreases accordingly. Beamforming is a technology for addressing this problem, that is, for reducing a propagation path loss and increasing a wave propagation distance.

In general, beamforming concentrates a wave propagation region in a specific direction by using a plurality of antennas, or increases the directivity of reception sensitivity in a specific direction. Herein, a group of a plurality of antennas may be referred to as an antenna array, and each antenna included in the antenna array may be referred to as an array element. The antenna array may be configured in various types such as a linear array and a planar array. When beamforming is used, a transmission distance is increased by an increased signal directivity and a signal is hardly transmitted in directions other than the direction of directivity. Therefore, an interference caused by other signals is greatly reduced. On the other hand, since the multipath characteristic of a channel is reduced due to beamforming, it is difficult to support transmission diversity.

Thus, in applying beamforming, it is preferable to determine whether to perform beamforming in consideration of the communication environment and channel characteristics, or perform a suitable type of beamforming. What is therefore desired is an alternative method for supporting and operating beamforming schemes with different propagation characteristics in wireless communication systems.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for supporting different propagation characteristics in a wireless communication system.

Another aspect of the present invention is to provide an apparatus and method for selecting an optimal propagation characteristic in a wireless communication system.

Another aspect of the present invention is to provide an apparatus and method for transmitting information on propagation characteristics operated in a wireless communication system.

Another aspect of the present invention is to provide an apparatus and method for transmitting feedback information used to select an optimal propagation characteristic in a wireless communication system.

In accordance with an aspect of the present invention, a method for operating a base station in a wireless communication system is provided. The method includes allocating resource periods for respective propagation characteristics, transmitting system information including information on the propagation characteristics, transmitting a reference signal with the propagation characteristic corresponding to the relevant resource period through at least one of the resource periods, and receiving feedback information determining channel qualities for all of the propagation characteristics.

In accordance with another aspect of the present invention, a method for operating a terminal in a wireless communication system is provided. The method includes receiving system information including information on propagation characteristics operated in a base station, detecting an allocation of resource periods for the propagation characteristics through the system information, detecting a reference signal with a propagation characteristic corresponding to a relevant resource period through at least one of the resource periods, and transmitting feedback information determining channel qualities for all of the propagation characteristics.

In accordance with another aspect of the present invention, an apparatus of a base station in a wireless communication system is provided. The apparatus includes a control unit for allocating resource periods for respective propagation characteristics, and a modem for transmitting system information including information on the propagation characteristics, transmitting a reference signal with the propagation characteristic corresponding to the relevant resource period through at least one of the resource periods, and receiving feedback information determining channel qualities for all of the propagation characteristics.

In accordance with another aspect of the present invention, an apparatus of a terminal in a wireless communication system is provided. The apparatus includes a modem receiving system information including information on propagation characteristics operated in a base station, and a control unit detecting an allocation of resource periods for the propagation characteristics through the system information, wherein the modem detects a reference signal with a propagation characteristic corresponding to a relevant resource period through at least one of the resource periods, and transmits feedback information determining channel qualities for all of the propagation characteristics.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description when taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENTS

Figure 1A:
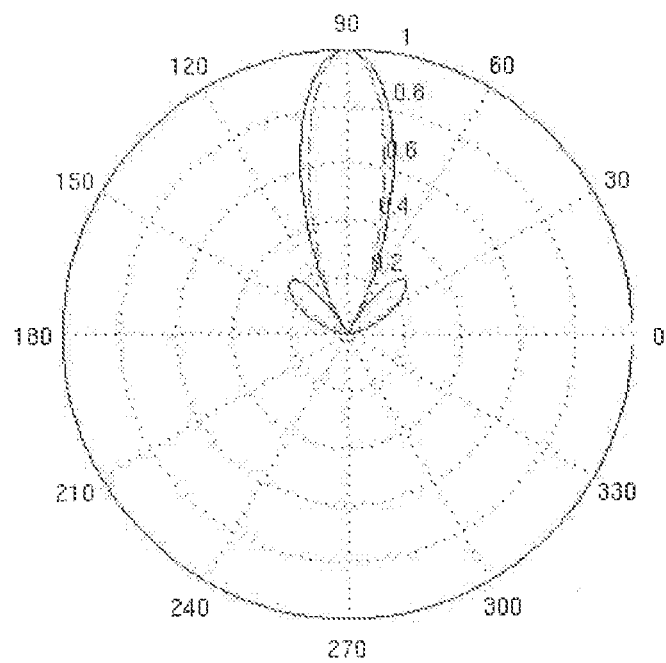
FIGS. 1A and 1B are diagrams illustrating examples of beam patterns with different beamwidths in a wireless communication system according to an exemplary embodiment of the present invention.
Figure 1A:
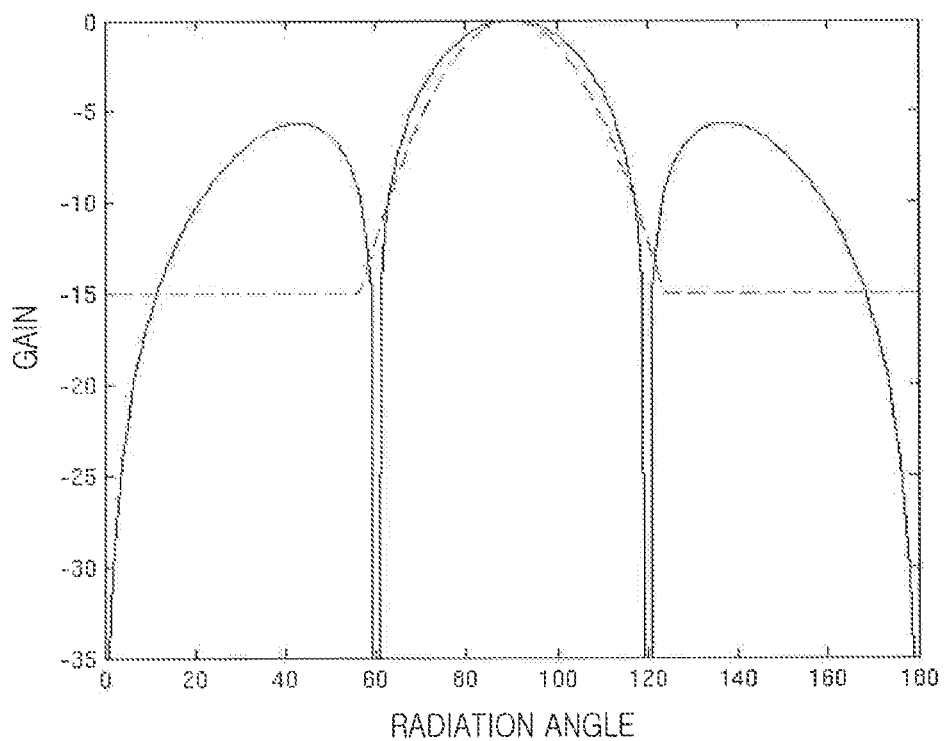

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

More particularly, the present invention relates to an apparatus and method for operating multiple beamforming transceivers with different characteristics in a wireless communication system. Hereinafter, technologies for supporting beamforming schemes with different propagation characteristics in a wireless communication system according to exemplary embodiments of the present invention will be described.

A wireless communication system according to an exemplary embodiment of the present invention operates based on beamforming, and applies different propagation characteristics according to the utilization and purpose of a transmission (TX) signal. In addition, the wireless communication system according to an exemplary embodiment of the present invention may apply different propagation characteristics according to link characteristics. Accordingly, the present disclosure describes information used to operate different propagation characteristics, a process of selecting different propagation characteristics based on the information, an operation and configuration of a base station for transmitting signals having the coexistence of different propagation characteristics, and an operation and configuration of a terminal receiving signals having the coexistence of different propagation characteristics.

Propagation characteristics considered in the present disclosure are characteristics of signals transmitted/received through antennas. For example, the propagation characteristics include physical characteristics of waves and propagation characteristics depending on transmission/reception (TX/RX) antenna structures. Specifically, the physical characteristics of waves include polarization (or polarized wave) characteristics and the amplitude (e.g., strength) of a wave, and the propagation characteristics depending on TX/RX antenna structures include a beam pattern. The polarization characteristics are generally classified into linear polarization (e.g., linearly polarized wave) and circular polarization (e.g., circularly polarized wave) according to the propagation direction of a wave and the form of a generated electric field.

The characteristics of signals vary according to the propagation characteristics. Thus, signals with different propagation characteristics may be used according to the purposes of systems. For example, as for the beam pattern that is one of the propagation characteristics depending on TX/RX antenna structures, a narrow beamwidth and a wide beamwidth provide different channel propagation effects.

Figure 1B:
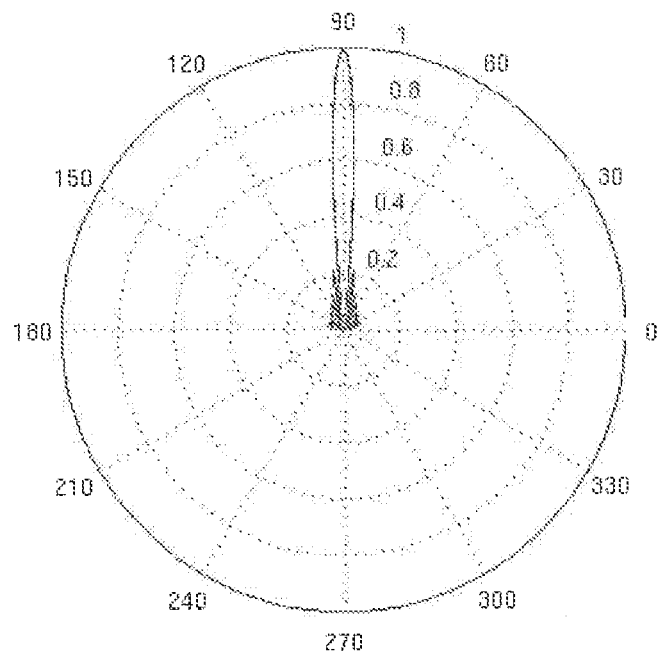
Figure 1B:
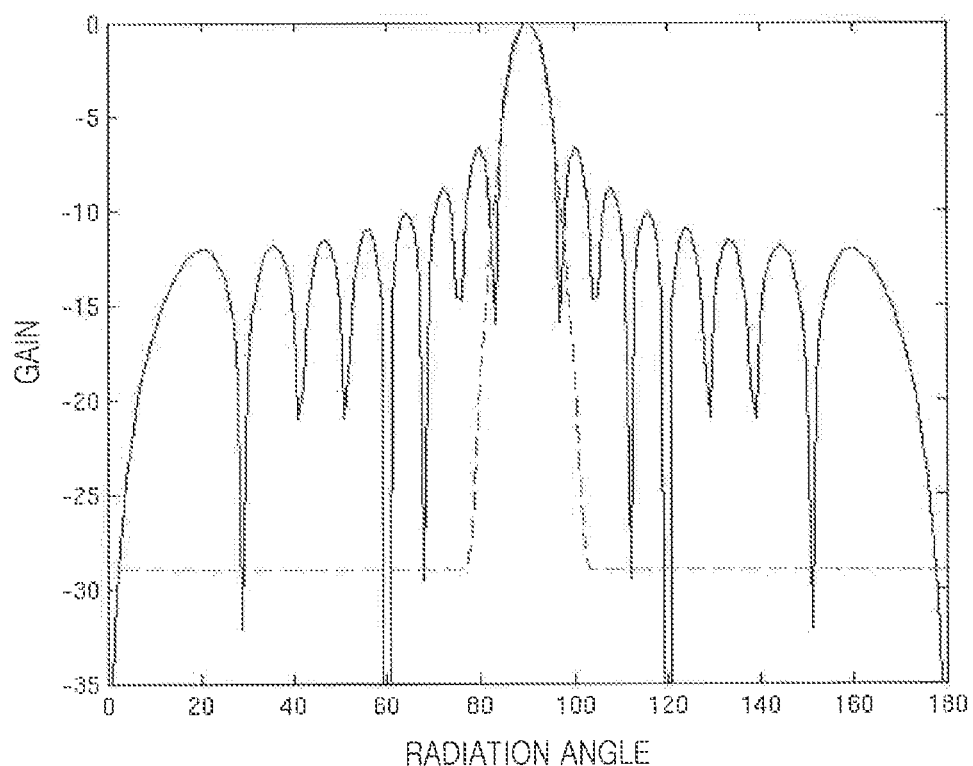

FIGS. 1A and 1B illustrate examples of beam patterns with different beamwidths in a wireless communication system according to an exemplary embodiment of the present invention.

Referring to FIGS. 1A and 1B, FIG. 1A illustrates a beam pattern with a wide beamwidth, and FIG. 1B illustrates a beam pattern with a narrow beamwidth.

The propagation characteristics depending on beamwidths are as follows. If a beam pattern has a wide beamwidth, a signal radiated from an antenna undergoes a spatially wide channel. An example of an extremely wide beamwidth is an isotropic pattern that is radiated uniformly in all directions. A sector antenna of a base station used in a mobile communication system of the related art uses a beam pattern covering the entire range of an angle corresponding to one sector around the sector antenna.

As for a signal with a wide beamwidth, since the effect of spatially concentrating the energy of a signal radiated from an antenna is small, an antenna gain is not relatively large. However, the propagation of a signal through a spatially wide channel increases the probability of generating independent signal paths between a TX antenna and an RX antenna.

On the other hand, if a beam pattern has a narrow beamwidth, a signal radiated from an antenna undergoes a spatially narrow channel. In this case, since the effect of spatially concentrating the energy of a radiated signal is large, an antenna gain is relatively large. However, the propagation of a signal through a spatially narrow channel reduces the probability of generating independent signal paths between a TX antenna and an RX antenna.

Hereinafter, examples of the use of different propagation characteristics according to exemplary embodiments of the present invention will be described.

Different beamwidth characteristics may be used as follows. If the system supports only a wide beamwidth, an antenna gain is low. Therefore, the capability of compensating for a large path loss in an ultra-high frequency band is greatly degraded. Accordingly, the size of a cell region is greatly reduced. On the other hand, if the system supports only a narrow beamwidth, a point-to-point link channel capacity is improved. However, the efficiency of transmitting control information such as a reference signal and broadcast information using point-to-multipoint transmission is low, and an overhead is increased. Thus, it is efficient for the system to use signals with different beamwidths according to the purposes and characteristics of signals transmitted.

For example, as described below with reference to FIG. 2, a signal unicast to a terminal may be beam-formed into a narrow beam, and a signal broadcast or multicast to a plurality of terminals may be beam-formed into a wide beam.

Figure 2:
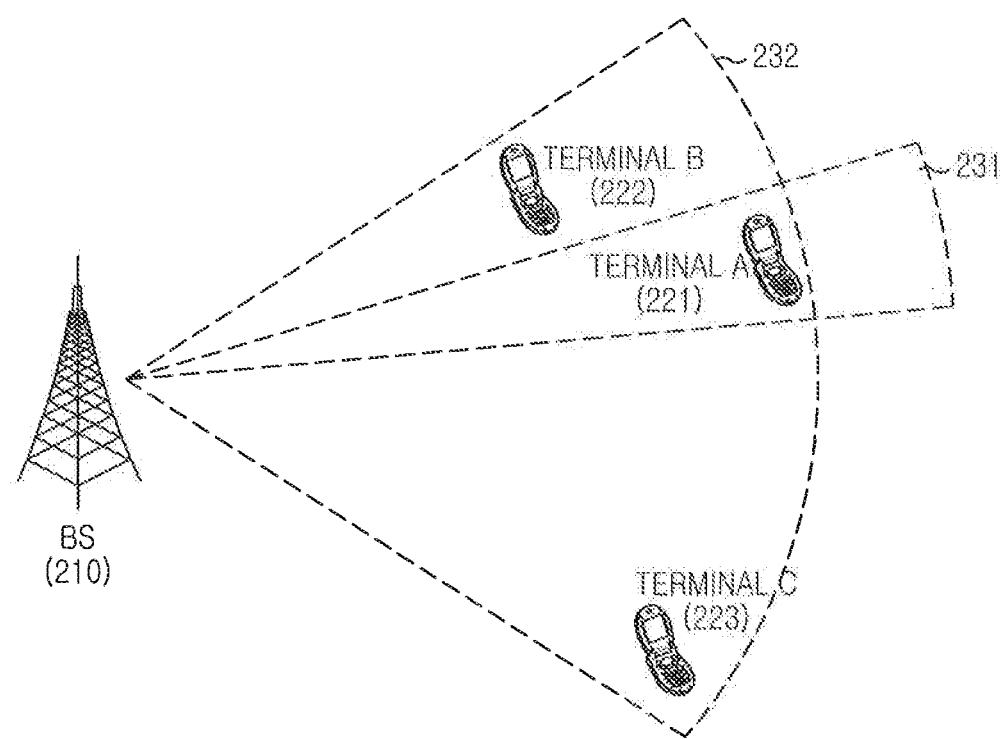
FIG. 2 is a diagram illustrating an example of the use of beamwidths depending on data characteristics in a wireless communication system according to an exemplary embodiment of the present invention.

FIG. 2 illustrates an example of the use of beamwidths depending on data characteristics in a wireless communication system according to an exemplary embodiment of the present invention.

Referring to FIG. 2, a base station 210 transmits unicast data to a terminal A 221, and transmits multicast data or broadcast data to the terminal A 221, a terminal B 222, and a terminal C 223. In this case, the base station 210 forms a narrow-beamwidth signal 231 in order to transmit unicast data to the terminal A 221, and forms a wide-beamwidth signal 232 in order to transmit multicast data or broadcast data to the terminals. However, even in the case of the multicast data or the broadcast data, if the terminal A 221, the terminal B 222, and the terminal C 223 are concentrated in a narrow region, the base station 210 may form a narrow-beamwidth signal.

Also, different beamwidth characteristics may be used as follows. An outdoor macro base station and an indoor femto base station may use different beamwidth characteristics. The macro base station provides a service in a cell that is relatively wide and open. Thus, in the cell, a propagation shadow area may be generated due to structures such as buildings. Thus, the macro base station may use narrow-beamwidth propagation characteristics by considering the size of a cell, the distance from a terminal, and the channel condition of a terminal. The femto base station is a small-sized base station installed in a propagation shadow area (such as a home or an office) of the macro base station, and provides a service only in an area that is smaller in comparison with a macro cell. Thus, the femto base station can secure a cell region even by a signal with wide-beamwidth propagation characteristics, and therefore has no need to increase an overhead by using a narrow-beamwidth signal. Thus, as described below with reference to FIG. 3, different beamwidths can be used according to cell characteristics.

Figure 3:
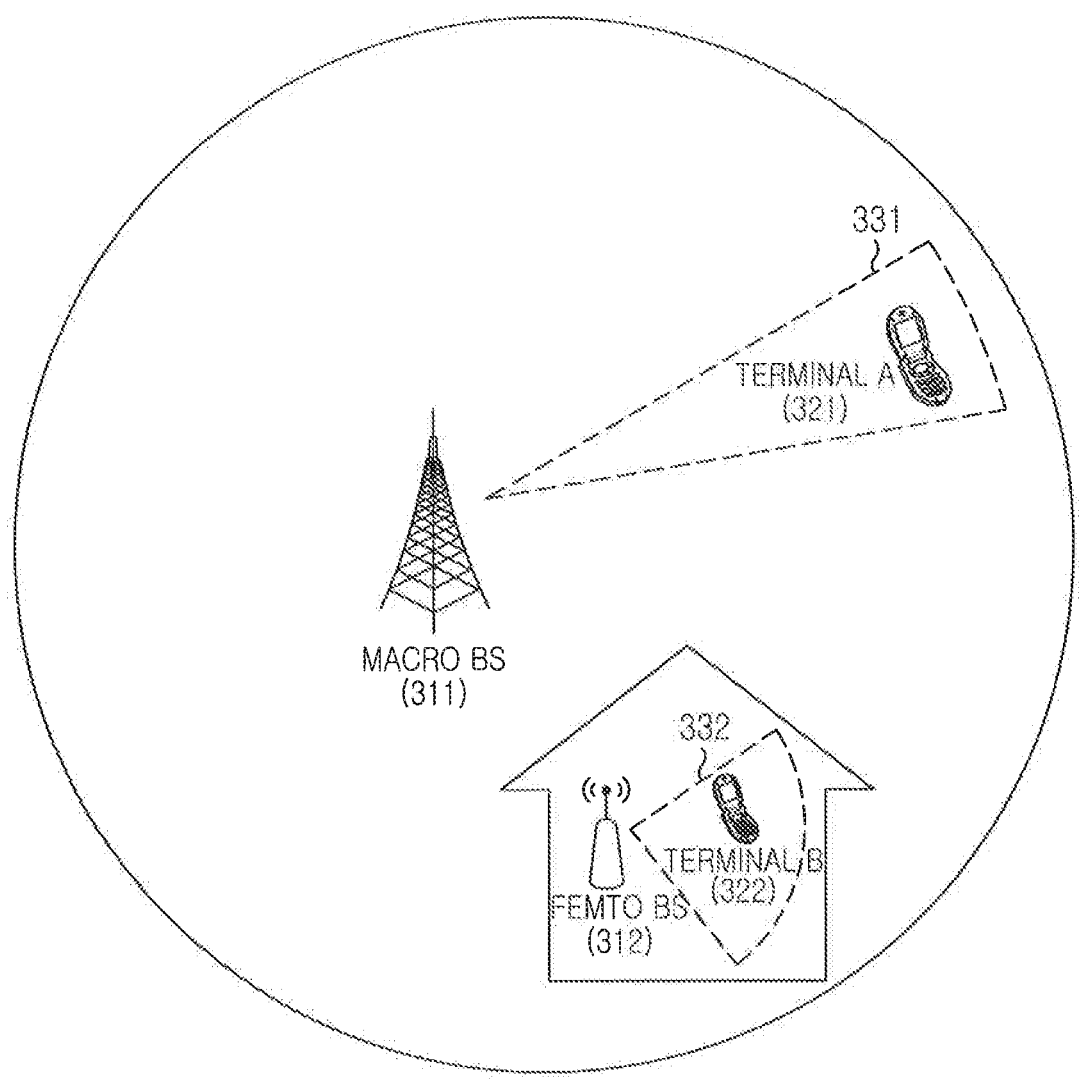
FIG. 3 is a diagram illustrating an example of the use of beamwidths depending on cell characteristics in a wireless communication system according to an exemplary embodiment of the present invention.

FIG. 3 illustrates an example of the use of beamwidths depending on cell characteristics in a wireless communication system according to an exemplary embodiment of the present invention.

Referring to FIG. 3, a macro base station 311 uses a narrow beam 331 to communicate with terminal A 321, and a femto base station 312 uses a wide beam 332 to communicate with terminal B 322.

In addition, in an environment where a link quality is good even when a wide beamwidth is used, for example, an environment where the distance between a base station and a terminal is not long, specifically, in the case of the femto base station, the base station can support Multiple-Input Multiple-Output (MIMO) transmission by using a signal with a wider beamwidth. To this end, the base station may feed back information from a user (such as a channel quality and a preferred MIMO transmission technique), determine a data transmission scheme according to the fed-back information, determine a propagation characteristic suitable for the determined data transmission scheme, and then transmit/receive signals. In this case, the entire resource may be divided to set periods to which different propagation characteristics are applied, and information on period allocation may be notified to a terminal.

Different polarization characteristics may be used as follows. Polarization is determined by the type of an antenna radiating a wave. The system may improve communication performance by actively using the polarization characteristics. For example, the system may use the fact that signals with different polarization characteristics are small in mutual interference at reception. The polarization characteristics have the greatest influence when a channel between a base station and a terminal is Line-of-Sight (LoS). Thus, to a terminal in a LoS channel environment, the base station may transmit a signal with a polarization characteristic different from polarization characteristics of a signal to other terminals.

For example, as described below with reference to FIG. 4, signals with different polarization characteristics may be transmitted to respective terminals.

Figure 4:
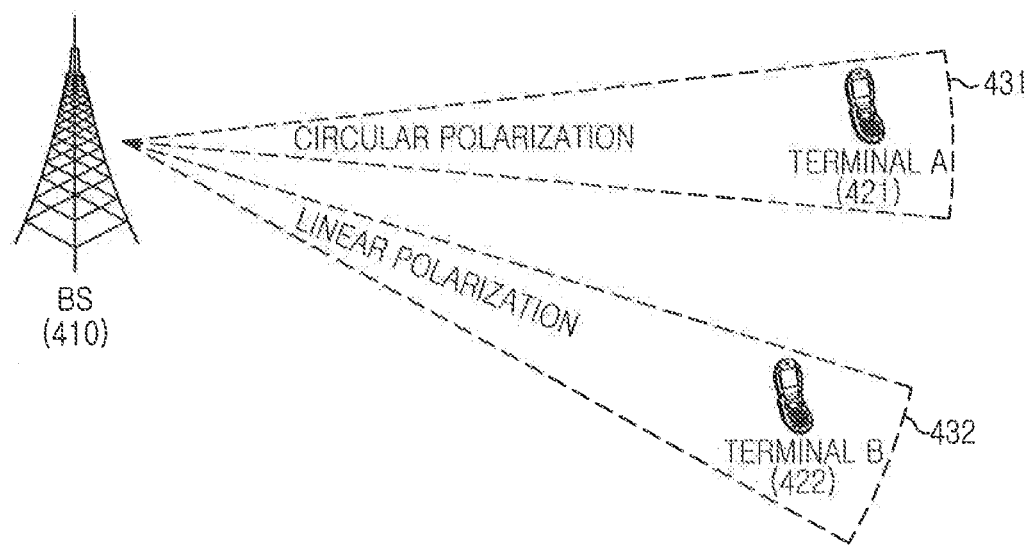
FIG. 4 is a diagram illustrating an example of the use of polarization characteristics in a wireless communication system according to an exemplary embodiment of the present invention.

FIG. 4 illustrates an example of the use of polarization characteristics in a wireless communication system according to an exemplary embodiment of the present invention.

Referring to FIG. 4, a base station 410 transmits a circular-polarization signal 431 to a terminal A 421, and transmits a linear-polarization signal 432 to a terminal B 422. To this end, the base station 410 may include a first antenna generating a circular polarization and a second antenna generating a linear polarization. By more actively using the fact that a mutual interference is small when the polarization characteristics are different, the base station 410 may transmit signals 431 and 432 with different polarization characteristics through the same resources (e.g., frequency resources and time resources). In this case, since resource use efficiency increases, system capacity is expected to increase.

A scheme based on the polarization characteristics is more advantageous as the number of propagation paths decreases. Therefore, the scheme is suitable for an environment where a narrow-beamwidth signal is used. However, since propagation path characteristics are different between users, a base station should select a user to which polarization characteristics are to be applied, and should feed back channel information from a user in selecting the user. Also, when polarization characteristics are used as described above, the base station should notify the terminal of the polarization characteristics applied to the terminal.

According to the above examples of the use of propagation characteristics, the system may be operated as follows.

A base station supports a plurality of beam patterns, and applies a specific beam pattern with discrimination between a control channel and a data channel. To this end, the base station has the capability of generating a plurality of beam patterns. For example, when using an array antenna including a plurality of antenna elements, a base station may control a beamwidth by the number of elements used for signal radiation. When desiring to form a narrow beam, the base station radiates a signal through all the antenna elements. In this case, since the antenna gain of a main lobe of a beam pattern is relatively large, a signal may have relatively large power when received at an RX terminal through a channel. Accordingly, a received signal strength of a link increases. On the other hand, when desiring to form a wide beam, the base station radiates a signal through only some of the antenna elements in an exemplary embodiment. In this case, since the antenna gain of a main lobe of a beam pattern is relatively small, a received signal strength of a link is small. As another example, a base station may control a beamwidth by using the phase and amplitude of a signal controlled by each antenna element. As yet another example, a base station may control a beam pattern and a beamwidth by using a baseband digital precoder and a Radio Frequency (RF) analog beamformer together.

As for a beam pattern with a narrow beamwidth, since a signal is effectively transmitted only to a spatially narrow area, it is not suitable for simultaneous reception by a plurality of terminals. On the other hand, as for a beam pattern with a wide beamwidth, since a signal is effectively transmitted to a spatially wide area, it is suitable for simultaneous reception by a plurality of terminals. Thus, a signal transmitted to a plurality of terminals distributed over a wide area may be transmitted by a beam pattern with a wide beamwidth, and a signal transmitted to one terminal or a small number of terminals located in a narrow area may be transmitted by a beam pattern with a narrow beamwidth.

Thus, a beam pattern may be applied differently according to whether a channel is for point-to-point communication. Specifically, the system may apply a narrow-beamwidth beam pattern to a channel for point-to-point communication and apply a wide-beamwidth beam pattern to a channel for point-to-multipoint communication or broadcasting. Examples of the channel for point-to-point communication include a unicast data channel and a unicast control channel. Examples of the channel for point-to-multipoint communication or broadcasting include a channel for transmission of system information to a plurality of terminals, a synchronization channel for acquisition of time/frequency synchronization of a terminal, and a broadcast channel for information transmitted to terminals in the system.

Also, a base station may change a beam pattern according to the current condition of a terminal. Examples of the beam pattern change are as follows.

For example, while a terminal receives a data channel at a distance from a base station by using a beam pattern with a narrow beamwidth, when a path loss decreases due to the approach of the terminal to the base station, the base station may increase an Adaptive Modulation and Coding (AMC) level to increase transmission efficiency and improve system performance. However, the maximum efficiency of AMC with respect to one stream is determined by a modulation order and a coding rate thereof. Thus, when a path loss decreases in excess of the maximum AMC transmission efficiency, the terminal may request application of a beam pattern with a beamwidth wider than a current beamwidth, or may notify a current condition to the base station, so that the base station applies a beam pattern with a wider beamwidth.

As another example, while a terminal receives a data channel by using a beam pattern with a narrow beamwidth, when RX power decreases rapidly due to the interruption of a signal path by an obstacle, the terminal may request a change into a TX beam headed in a different direction. However, when a path loss of the TX beam headed in a different direction is not satisfactory due to an obstacle, the terminal may request application of a beam pattern with a wide beamwidth, or may notify a current condition to the base station, so that the base station applies a beam pattern with a wider beamwidth.

As described above, the system may improve the system performance by applying an optimal beam pattern according to the type of a channel, the condition of a terminal, and a communication environment. When the system is operated by using different beam patterns, a base station should provide terminals with information related to a current beam pattern so that smooth communication can be performed by allowing the terminal to be preferentially notified of the use amount and the use method of resources varying according to beam patterns.

An example of beam pattern information provided by a base station is as follows. As the degree of a narrow beamwidth varies, the number of times of transmitting a reference signal for covering all the areas in a cell may vary. For example, if an azimuth angle in a cell is represented in 360 degrees, when a wave having the characteristics of a beam pattern with a beamwidth of 10 degrees is used, the transmission of a reference signal in different directions at least 36 times is performed. As another example, when a cell is divided into three sectors and each sector has an azimuth angle of 120 degrees, the transmission of a reference signal in each sector at least 12 times is performed. As yet another example, when a wave having the characteristics of a beam pattern with a beamwidth of 30 degrees is used, the transmission of a reference signal at least 12 times is required in a 360-degree cell and the transmission of a reference signal at least 4 times is required in a 120-degree sector. For example, the number of times of transmitting a reference signal varies by a beamwidth, and the amount of resources used to transmit the reference signal varies accordingly. Thus, information indicating the number of times of transmitting the reference signal should be provided to the terminal. Herein, the reference signal may also be referred to as 'synchronization signal', 'preamble', 'midamble', 'pilot signal', or the like.

Another example of beam pattern information provided by a base station is as follows. A terminal should estimate a path loss of a signal from a base station. The path loss is a difference between the TX power of a base station and the RX power of a terminal, and the TX power of the base station may vary according to a TX antenna gain. When a beamwidth varies, a maximum antenna gain of a main lobe varies. From the viewpoint of a terminal, the variation of a beamwidth according to a beam pattern used by a base station means the variation of a maximum TX antenna gain, and also means the variation of Effective Isotropic Radiated Power (EIRP). Thus, the terminal should be provided with a TX power value for each beam pattern supported by the base station, and related information for calculation of the TX power value. Examples of the related information may include a maximum TX antenna gain for each beam pattern, an antenna gain, and base station TX power.

Yet another example of beam pattern information provided by a base station is as follows. When resources for data transmission are allocated and different beam patterns are applied to the allocated resources, a base station provides a terminal with resource allocation information in addition to beam pattern information. For example, when a time resource period is divided into a first period and a second period and when a wide-beamwidth beam pattern is used in the first period and a narrow-beamwidth beam pattern is used in the second period, the base station notifies terminals of the positions of the first period and the second period and the terminals detect the respective resource periods and then perform smooth communication.

In summary, the beam pattern information provided by the base station may include at least one of information indicating the number of times of transmitting a reference signal, related information for calculation of the number of times of transmitting the reference signal, a TX power value for each beam pattern, related information for calculation of the TX power value for each beam pattern, a maximum TX antenna gain for each beam pattern, and resource allocation information depending on an applied beam pattern.

When the system operates a plurality of beam patterns in a unicast channel, a base station should feed back related information from a terminal in order to determine an optimal beam pattern. Basically, in addition to a Channel Quality Indicator (CQI) indicating the level of a link between the system and a terminal, the following items may be further included.

When a path loss is very small because a terminal is located at a sufficiently short distance from a base station, the improvement of link RX power by a narrow beamwidth may not be necessary. When possible MIMO transmission is suitable in a wide channel propagation environment, a unicast channel for the terminal may belong to a resource period using a wide beamwidth. Thus, the terminal needs to notify the base station of a path loss value for each beam pattern of each beamwidth. Also, in order for the base station to determine an optimal beam pattern, the terminal may feed back a preferred beam pattern among a plurality of beam patterns operated in the system, a beam direction, and the like. Also, when a channel interference is small, since the improvement of link RX power by a narrow beamwidth is not necessarily required, the terminal needs to notify an interference amount to the base station.

In summary, the feedback information of the terminal may include at least one of a CQI, a path loss for each beam pattern, a preferred beam pattern, a preferred beam direction, a CQI for each beam pattern or direction, and an interference amount.

As described above, when a terminal feeds back information of a plurality of items, the feedback periods of the respective items may be different from each other. For example, the feedback periods may be set differently according to the statistics of the value change frequencies of the respective items. For example, the item with a frequently-changing value may be fed back at relatively short periods, and the item with a rarely-changing value may be fed back at relatively long periods. As a specific example, the interference amount may be fed back at longer periods than the CQI. As another example, the preferred beam direction may be fed back at longer periods than the CQI.

As described above, a terminal may feed back a CQI. The CQI may be at least one of a Carrier-to-Interference and Noise Ratio (CINR), a Signal-to-Interference and Noise Ratio (SINR), a Signal-to-Noise Ratio (SNR), or the like, and may be related to a received signal strength. Also, the CQI may be related to an interference strength. Thus, since the CQI varies as a beam pattern changes, a base station should obtain CQI information for each beam pattern.

According to an exemplary embodiment of the present invention, a terminal may measure CQIs for all beam patterns and feed back all the CQIs for the respective beam patterns. In this case, a structure of a reference signal for measurement of a CQI may be the same as that described below with reference to FIG. 5.

Figure 5:
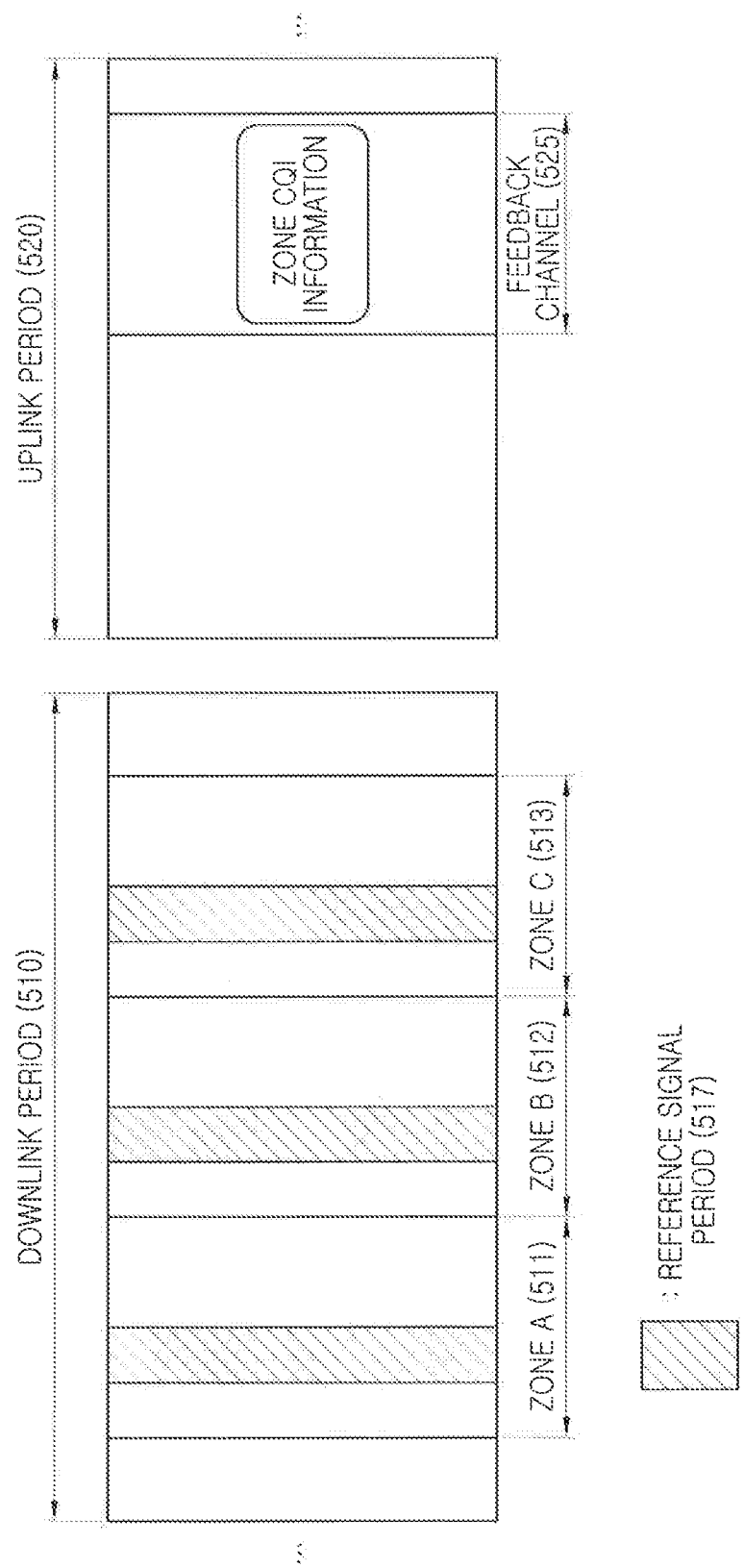
FIG. 5 is a diagram illustrating examples of reference signal and channel information feedback in a wireless communication system according to an exemplary embodiment of the present invention.

FIG. 5 illustrates examples of reference signal and channel information feedback in a wireless communication system according to an exemplary embodiment of the present invention.

Referring to FIG. 5, a frame is divided into a downlink period 510 and an uplink period 520. In FIG. 5, the downlink period 510 and the uplink period 520 are divided in a time axis. However, according to another exemplary embodiment of the present invention, the downlink period 510 and the uplink period 520 may be divided in a frequency axis. FIG. 5 assumes the case where three zones are defined for respective beam patterns. For example, a zone A 511 may be a period in which an isotropic beam pattern radiated uniformly in all directions is applied, a zone B 512 may be a period in which a wide-beamwidth beam pattern is applied, and a zone C 513 may be a period in which a narrow-beamwidth beam pattern is applied.

As illustrated in FIG. 5, the zone A 511, the zone B 512, and the zone C 513 all include a reference signal period 517. A base station transmits one or more reference signals beamformed by a beam pattern of the relevant zone through the reference signal period 517. In this case, the number of reference signals transmitted may be determined according to a beamwidth. For example, as a beamwidth decreases, a larger number of reference signals may be transmitted. Accordingly, a terminal measures a CQI for each beam pattern by using a reference signal received through the reference signal period 517 of each of the zones 511, 512 and 513. In this case, through information received from the base station, the terminal detects the position of each of the zones 511, 512 and 513 and the number of times of transmitting a reference signal in each zone. Then, in the uplink period 520, the terminal feeds back CQI information for each zone through a feedback channel 525.

In the exemplary embodiment described with reference to FIG. 5, the reference signals using the respective beam patterns are transmitted for measurement of the CQIs for all the beam patterns. Thus, overhead due to a reference signal and overhead of CQI information may be large. In order to reduce the above-identified overhead, only reference signals for some beam patterns may be transmitted. In another exemplary embodiment, reference signals for some beam patterns may be transmitted at predetermined periods, and reference signals for the other beam patterns may be transmitted at relatively long periods. For example, from the viewpoint of a specific time point, it is observed that only reference signals for some beam patterns are transmitted. An exemplary embodiment in which only reference signals for some beam patterns are transmitted is described below with reference to FIG. 6.

Figure 6:
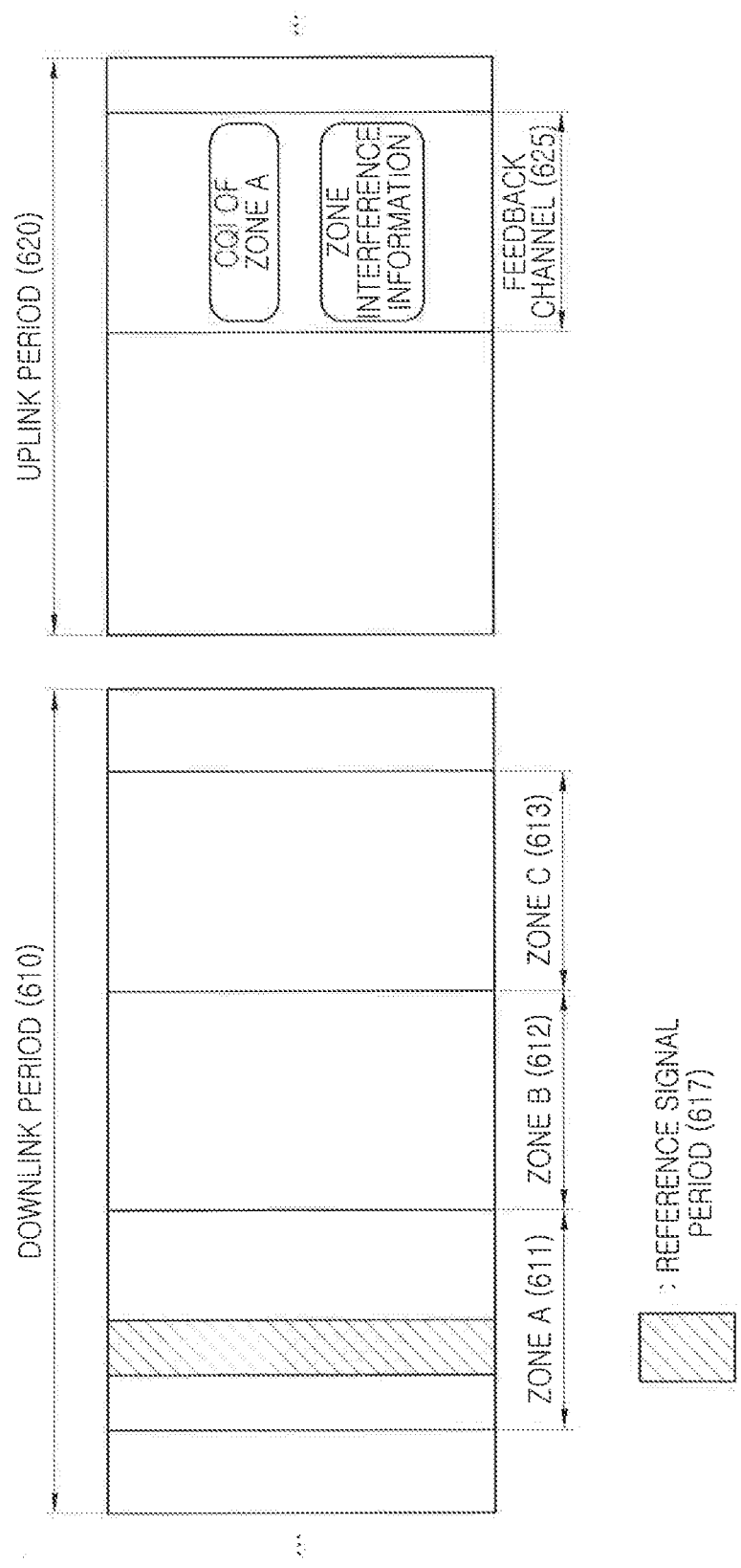
FIG. 6 is a diagram illustrating examples of reference signal and channel information feedback in a wireless communication system according to another exemplary embodiment of the present invention.

FIG. 6 illustrates examples of reference signal and channel information feedback in a wireless communication system according to another exemplary embodiment of the present invention.

Referring to FIG. 6, a frame is divided into a downlink period 610 and an uplink period 620. In FIG. 6, the downlink period 610 and the uplink period 620 are divided in a time axis. However, according to another exemplary embodiment of the present invention, the downlink period 610 and the uplink period 620 may be divided in a frequency axis. FIG. 6 assumes the case where three zones are defined for respective beam patterns. For example, a zone A 611 may be a period in which an isotropic beam pattern radiated uniformly in all directions is applied, a zone B 612 may be a period in which a wide-beamwidth beam pattern is applied, and a zone C 613 may be a period in which a narrow-beamwidth beam pattern is applied.

As illustrated in FIG. 6, among the zone A 611, the zone B 612 and the zone C 613, only the zone A 611 includes a reference signal period 617. A base station transmits one or more reference signals beamformed by a beam pattern of the relevant zone through the reference signal period 617. Accordingly, a terminal measures a CQI for a beam pattern applied to the zone A 611 by using a reference signal received through the reference signal period 617 of the zone A 611. In this case, through information received from the base station, the terminal detects the position of each of the zones 611, 612 and 613 and the number of times of transmitting a reference signal. Then, in the uplink period 620, the terminal feeds back CQI information for the zone A 611 through a feedback channel 625.

Since only CQI information for the zone A 611 is fed back, the base station cannot know beam patterns applied to the zone B 612 and the zone C 613. Thus, the terminal measures a downlink interference in each of the zones 611, 612 and 613 and provides information related to an interference amount for each zone through the feedback channel 625, so that the base station can calculate CQIs for beam patterns applied to the zone B 612 and the zone C 613. For example, the terminal may measure the interference by using pilot symbols transmitted in the zone B 612 and the zone C 613 for equalization of data symbols. Herein, the interference may be referred to as a Noise and Interference (NI), an Interference over Thermal (IoT), or the like. Accordingly, the base station calculates a CQI of each zone by using a CQI for the zone A 611 and an interference amount for each zone.

For example, a process of calculating the CQI of each zone is as follows. Since the CQI is a signal-to-noise and interference ratio, when an interference amount is known, the strength of a desired signal can be calculated. For example, the strength of a desired signal for a beam pattern applied to the zone A 611 can be calculated by using a CQI for the zone A 611 and an interference amount for the zone A 611. Then, since the base station knows a gain difference between beam patterns, the base station can calculate the strengths of desired signals for the beam patterns applied to the zone B 612 and the zone C 613 from the strength of a desired signal for the beam pattern applied to the zone A 611, by considering the gain difference. Accordingly, the base station knows both the interference amount and the strengths of desired signals for the beam patterns applied to the zone B 612 and the zone C 613, and thus can calculate CQIs for the zone B 612 and the zone C 613.

Referring to FIG. 6, CQI information for the zone A 611 and an interference amount for each zone are transmitted through the feedback channel 625. Although not illustrated in FIG. 6, the CQI information and the interference amount for each zone may be fed back at different time intervals. For example, the interference amount for each zone may be fed back at longer periods than the CQI information. The reason for this is that the interference does not greatly change for a long time as compared to the CQI. Accordingly, as compared to the case of feeding back the CQI for each zone at short periods, the case of feeding back only the CQI for one zone at short periods and feeding back information related to an interference for each zone at long periods can reduce an overall feedback overhead.

Also, in FIG. 6, since only the zone A 611 includes the reference signal period 617, an overhead due to a reference signal is reduced. As the beamwidth decreases, the number of reference signals required increases. Therefore, in order to maximize the effect of overhead reduction, the reference signal period 617 may be included in the zone to which the widest-beamwidth beam pattern is applied.

Also, in FIG. 6, only the zone A 611 includes the reference signal period 617. However, according to another exemplary embodiment of the present invention, the zone B 612 and the zone C 613 may also include a reference signal period, and information fed back from the terminal may be a CQI for the zone A 611 and an interference amount for each zone. In this case, as compared to the exemplary embodiment of FIG. 5, an overhead due to a reference signal is the same but an amount of feedback information is reduced.

Hereinafter, operations and configurations of a terminal and a base station supporting a plurality of propagation characteristics according to an exemplary embodiment of the present invention will be described in detail with reference to the drawings.

Figure 7:
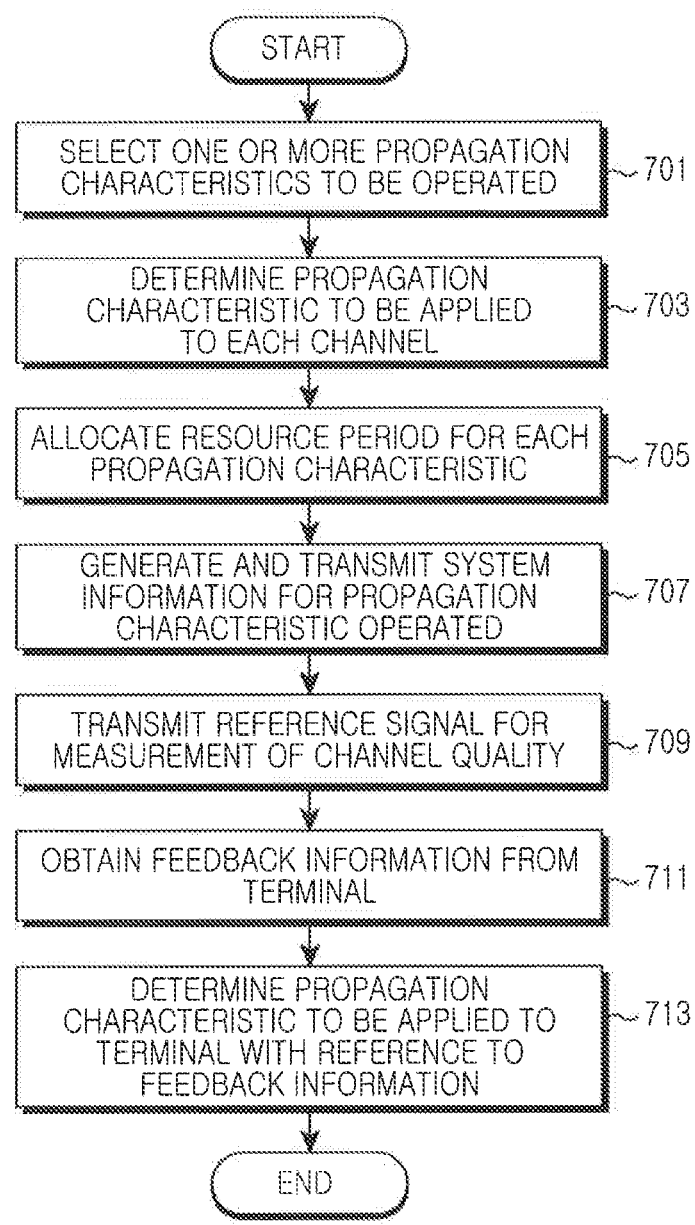
FIG. 7 is a flow diagram illustrating a process of operating a base station in a wireless communication system according to an exemplary embodiment of the present invention.

FIG. 7 illustrates a process of operating a base station in a wireless communication system according to an exemplary embodiment of the present invention.

Referring to FIG. 7, in step 701, the base station selects one or more propagation characteristics to be operated. The propagation characteristics may include at least one of characteristics of signals transmitted/received through antennas, polarization characteristics, a wave strength, and a beamwidth. For example, the base station selects propagation characteristics to be supported for communication with terminals, in other words, candidates for propagation characteristics used for communication. In this case, the base may consider a communication environment of the base station. For example, if the base station is a femto base station, the base station may determine to support only a wide-beamwidth beam pattern. According to another exemplary embodiment of the present invention, the base station may select one or more propagation characteristics to be operated, based on setting information predefined by a designer or an operator.

In step 703, the base station determines a propagation characteristic to be applied to each channel. Herein, the channel is divided according to the purpose of a signal and data transmitted. For example, the channel may be a broadcast channel for transmission of system data, a synchronization channel for transmission of a synchronization signal, a data channel for traffic transmission, or the like. In this case, the base station may determine propagation characteristics based on the range of receivers of a signal or data transmitted through a relevant channel, that is, for example, the number of receivers. For example, since the broadcast channel should be received by a plurality of terminals, the base station may determine to apply a wide-beamwidth beam pattern to the broadcast channel. As another example, since the data channel should be received by one terminal, the base station may determine to apply a narrow-beamwidth beam pattern to the data channel. However, in order for the data channel to be adapted according to a channel environment of a terminal, the base station may determine to apply both a narrow-beamwidth beam pattern and a wide-beamwidth beam pattern to the data channel.

In step 705, the base station allocates a resource period for each propagation characteristic. The resource period for each propagation characteristic is allocated in the data channel. For example, in order to support various propagation characteristics in the data channel, the base station allocates a resource period to which each propagation characteristic is applied. For example, as illustrated in FIG. 5 or 6, the base station may allocate a zone A, a zone B, and a zone C to which beam patterns with different beamwidths are applied. If supporting different polarization characteristics, the base station may allocate resource periods for the different polarization characteristics such that they overlap each other in a frequency axis and a time axis.

In step 707, the base station generates system information on propagation characteristics operated and transmits the system information. In other words, the base station generates and transmits system information indicating the facts determined through steps 701 and 703. Although not illustrated in FIG. 7, the system information may be transmitted periodically. Also, the system information may be transmitted through the broadcast channel. For example, the system information may include at least one of information indicating an operated propagation characteristic, information indicating the number of times of transmitting a reference signal, a TX power value for each propagation characteristic, a maximum TX antenna gain for each propagation characteristic, resource allocation information for each propagation characteristic, information indicating a beam direction, and related information for determination of at least one of the listed items.

In step 709, the base station transmits reference signals for channel quality measurement. The reference signals are transmitted through at least one of the resource periods for respective propagation characteristics. According to an exemplary embodiment of the present invention, the base station may transmit reference signals with respective propagation characteristics through respective resource periods for respective propagation characteristics with respect to all propagation characteristics. According to another exemplary embodiment of the present invention, the base station may transmit reference signals with relevant propagation characteristics through resource periods for relevant propagation characteristics with respect to some propagation characteristics. In this case, the base station may repeatedly transmit the reference signal with the some propagation characteristic in different beam directions. Thus, in order to reduce an overhead due to a reference signal, the some propagation characteristics may be transmitted in a wide beamwidth. Although not illustrated in FIG. 7, the reference signals may be transmitted periodically.

In step 711, the base station receives feedback information related to propagation characteristics from one or more terminals. For example, the feedback information may include at least one of a CQI, an interference amount, a path loss for each beam pattern, a preferred beam pattern, and a preferred beam direction. Herein, the CQI may be CQIs for the respective resource periods for respective propagation characteristics, or CQIs for some of the resource periods for respective propagation characteristics. When the feedback information includes only the CQIs for some of the resource periods for respective propagation characteristics, the feedback information may include interference amount information on the other resource periods.

In step 713, the base station determines propagation characteristics to be applied to the one or more terminals, with reference to the feedback information. In this case, the base station considers channel environments of the one or more terminals determined through the feedback information, a link quality, a preferred beam direction, a CQI, an LoS indication, polarization characteristics, and a path loss. For example, the base station may estimate a distance from a terminal and a channel environment (e.g., an LoS indication) based on the path loss. Also, the base station may determine an optimal beam pattern based on the CQI. If the system information includes an interference and a CQI for one or more beam patterns and only an interference for the other beam patterns, the base station may calculate CQIs for all the beam patterns by using the CQI and the interference. Specifically, when a link quality is higher than a threshold value, the base station may determine to apply a wide-beamwidth beam pattern to the relevant terminal. Also, in an LoS environment, the base station may determine to apply a specific polarization characteristic to the relevant terminal.

Although not illustrated in FIG. 7, the base station allocates resources to the one or more terminals according to the determination in step 713, and performs communication. Herein, the propagation characteristics determined in step 713 may be changed according to the state of each terminal. For example, when the path loss of a terminal is lower than a threshold value, the base station may change a beam pattern applied to the terminal into a beam pattern with a wider beamwidth. For example, when the path loss of a terminal increases due to an obstacle, the base station may change a beam direction of a beam pattern applied to the terminal or change the applied beam pattern into a beam pattern with a wider beamwidth. For example, when the path loss of a terminal increases due to an increased distance from a base station, the base station may change a beam pattern applied to the terminal into a beam pattern with a narrower beamwidth.

In the exemplary embodiment described with reference to FIG. 7, the base station determines propagation characteristics for respective channels and determines a resource period for each propagation characteristic. However, according to another exemplary embodiment of the present invention, at least one of step 703 for determining the propagation characteristics for respective channels and step 705 for determining each propagation characteristic may be omitted. For example, when the base station does not apply propagation characteristics differently according to channels, step 703 may be omitted. Also, for example, when the base station determines to operate only one propagation characteristic in step 701, step 703 and step 705 may be omitted.

Figure 8:
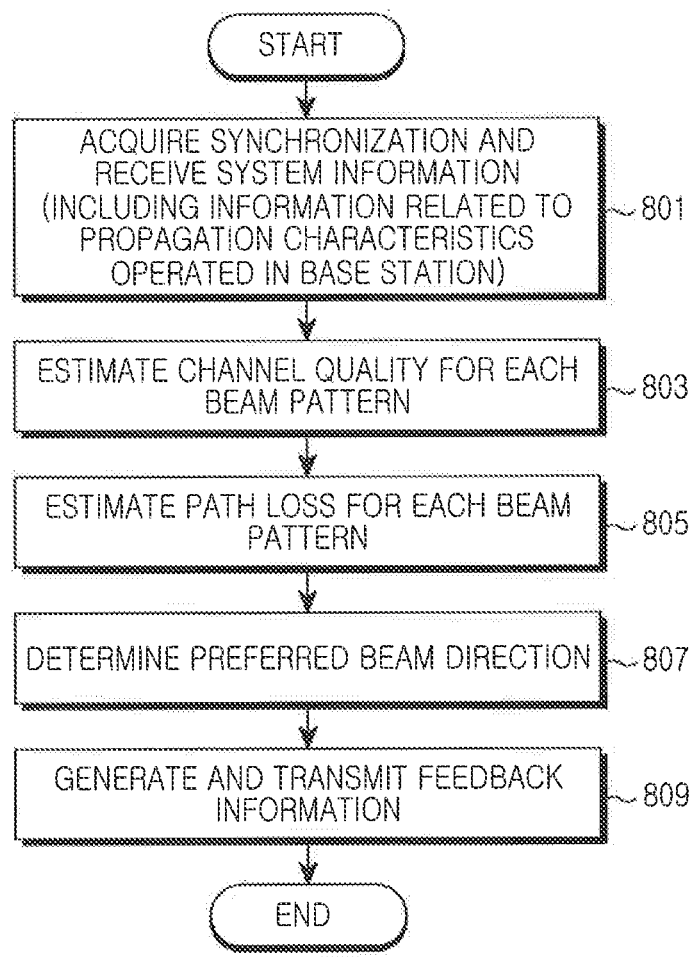
FIG. 8 is a flow diagram illustrating a process of operating a terminal in a wireless communication system according to an exemplary embodiment of the present invention.

FIG. 8 illustrates a process of operating a terminal in a wireless communication system according to an exemplary embodiment of the present invention.

Referring to FIG. 8, in step 801, the terminal acquires synchronization and receives system information. Specifically, the terminal acquires synchronization with a base station by detecting a synchronization channel, and receives the system information through a broadcast channel. The system information includes information on propagation characteristics operated in the base station. For example, the system information may include at least one of information indicating a propagation characteristic operated in the base station, information indicating the number of times of transmitting a reference signal, a TX power value for each beam pattern or propagation characteristic, a maximum TX antenna gain for each beam pattern or propagation characteristic, resource allocation information for each propagation characteristic, and related information for determination of at least one of the listed items.

In step 803, the terminal estimates a channel quality for each beam pattern or propagation characteristic. The terminal estimates the channel quality by using reference signals received from the base station. In this case, the reference signals are applied with all or some of the beam patterns or propagation characteristics operated in the base station, and the reference signal applied with the beam pattern or propagation characteristic is transmitted through a resource period allocated for the relevant beam pattern or propagation characteristic. Thus, through the system information, the terminal determines a resource period allocated for each beam pattern or propagation characteristic, whether a reference signal is transmitted in each resource period, and the number of times of transmitting a reference signal, and then detects a reference signal. According to an exemplary embodiment of the present invention, the reference signals may be transmitted in all of the resource periods. In this case, the terminal may measure CQIs for all the beam patterns or the respective propagation characteristics. On the other hand, according to another exemplary embodiment of the present invention, the reference signals may be transmitted only in one or more resource periods. In this case, the terminal may measure a CQI and interference for one or more beam patterns or propagation characteristics and measure only an interference for the other beam patterns or propagation characteristics. According to yet another exemplary embodiment of the present invention, even when the reference signals are transmitted in all the resource periods, the terminal may measure a CQI and interference for one or more beam patterns or propagation characteristics and measure only an interference for the other beam patterns or propagation characteristics.

In step 805, the terminal estimates a path loss for each beam pattern or propagation characteristic. The path loss may be estimated by using a TX power value for each beam pattern or propagation characteristic included in the system information received in step 801, or by using related information for calculation of the TX power value. For example, the terminal may detect a TX power value for each beam pattern or propagation characteristic or calculate a TX power value for each beam pattern or propagation characteristic by using the related information, and then may estimate the path loss by subtracting RX power from the TX power.

In step 807, the terminal determines a preferred beam direction. The reference signal transmitted by the base station may be repeatedly transmitted with the same propagation characteristic in different beam directions. Thus, the terminal attempts to detect a plurality of reference signals of different beam directions while applying the same beam pattern or propagation characteristic, and detects a plurality of reference signals accordingly. In this case, the terminal may determine a TX beam direction applied to the reference signal with the strong RX signal strength as a preferred TX beam direction. Also, the terminal may change an RX beam and detect a signal of the same TX beam direction repeatedly. In this case, the terminal may determine an RX beam direction applied to the reference signal with the strong RX signal strength as a preferred RX beam direction.

In step 809, the terminal generates feedback information and transmits the feedback information to the base station. The feedback information includes information used to determine a propagation characteristic to be applied to the terminal by the base station. For example, the feedback information is used to notify the facts determined through steps 803 to 807. For example, the feedback information may include at least one of a CQI for one or more beam patterns or propagation characteristics, an interference amount for each beam pattern or propagation characteristic, a path loss for each beam pattern or propagation characteristic, a preferred beam pattern or propagation characteristic, a preferred beam direction, and a CQI for each preferred beam pattern or beam direction. The feedback information may be periodically transmitted at pre-determined time intervals. In this case, information items included in the feedback information may vary. For example, the CQI and the interference amount are included, the interference amount may be fed back at longer periods than the CQI.

In the exemplary embodiment described with reference to FIG. 8, the terminal estimates a channel quality for each beam pattern or propagation characteristic, estimates a path loss for each beam pattern or propagation characteristic, and determines a preferred beam direction. However, according to another exemplary embodiment of the present invention, at least one of step 803 for estimating a channel quality for each beam pattern or propagation characteristic, step 805 for estimating a path loss for each beam pattern or propagation characteristic, and step 807 for determining a preferred beam direction may be omitted.

Figure 9:
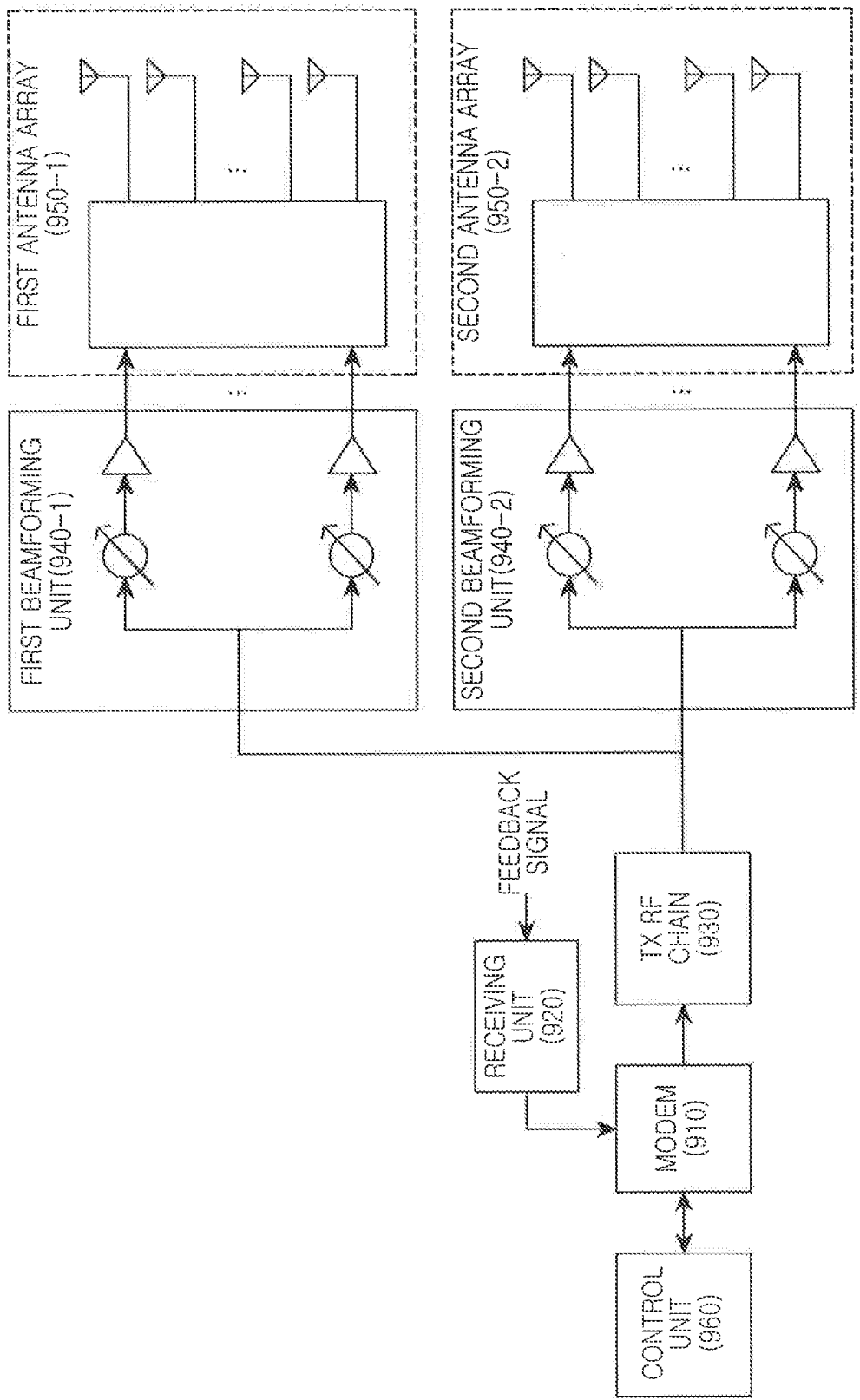
FIG. 9 is a block diagram illustrating a configuration of a base station in a wireless communication system according to an exemplary embodiment of the present invention.

FIG. 9 illustrates a block configuration of a base station in a wireless communication system according to an exemplary embodiment of the present invention.

Referring to FIG. 9, the base station may include a modem 910, a receiving unit 920, a TX RF chain 930, beamforming units 940-1 and 940-2, antenna arrays 950-1 and 950-2, and a control unit 960.

The modem 910 performs conversion between a baseband signal and a bitstream according to a physical layer standard of the system. For example, according to an Orthogonal Frequency-Division Multiplexing (OFDM) scheme, in a data transmission mode, the modem 910 generates complex symbols by encoding/modulating a TX bitstream, maps the complex symbols to subcarriers, and generates OFDM symbols by Inverse Fast Fourier Transform (IFFT) operation and Cyclic Prefix (CP) insertion. Also, in a data reception mode, the modem 910 divides a baseband signal into OFDM symbols, restores signals mapped to subcarriers by Fast Fourier Transform (FFT) operation, and restores a received bitstream by demodulation and decoding. The receiving unit 910 converts an RF signal received from a terminal into a baseband digital signal. Although not illustrated in the drawings, the receiving unit 920 may include an antenna and an RX RF chain.

The TX RF chain 930 converts a baseband digital signal stream received from the modem 910 into an RF analog signal. For example, the TX RF chain 930 may include an amplifier, a mixer, an oscillator, a Digital-to-Analog Converter (DAC), and a filter. FIG. 9 illustrates only one TX RF chain 930. However, according to another exemplary embodiment of the present invention, the base station includes a plurality of TX RF chains. In this case, the base station may simultaneously form a plurality of TX beams as many as the number of TX RF chains.

The beamforming units 940-1 and 940-2 perform TX beamforming on a TX signal received from the TX RF chain 930. For example, each of the beamforming units 940-1 and 940-2 includes a plurality of phase shifters, a plurality of amplifiers, and a signal adder. For example, the beamforming units 940-1 and 940-2 divide a TX signal received from the TX RF chain 930 into signals as many as the number of antennas included in the antenna arrays 950-1 and 950-2, and adjust the phases and amplitudes of the signals divided. The beamforming units 940-1 and 940-2 correspond respectively to the antenna arrays 950-1 and 950-2.

Each of the antenna arrays 950-1 and 950-2 is a group of antennas, and includes a plurality of array elements. The antenna arrays 950-1 and 950-2 radiate signals received from the beamforming units 940-1 and 940-2 to wireless channels. Herein, the first antenna array 950-1 and the second antenna array 950-2 have different polarization characteristics. For example, the first antenna array 950-1 generates a circular polarization and the second antenna array 950-2 generates a linear polarization. According to another exemplary embodiment of the present invention, an antenna array with a different polarization characteristic may be added, or only one antenna array may be provided.

The control unit 960 controls an overall operation of the base station. For example, the control unit 960 generates a TX traffic packet and message and provides the same to the modem 910, and interprets an RX traffic packet and message received from the modem 910. In particular, according to an exemplary embodiment of the present invention, the control unit 960 controls to support a plurality of propagation characteristics. An operation of the control unit 960 for supporting the plurality of propagation characteristics will be described below.

The control unit 960 selects one or more propagation characteristics to be operated, determines a propagation characteristic to be applied to each channel, allocates a resource period for each propagation characteristic, and system information on a propagation characteristic operated. For example, the system information may include at least one of information indicating a propagation characteristic operated, information indicating the number of times of transmitting a reference signal, a TX power value for each beam pattern, a maximum TX antenna gain for each beam pattern, resource allocation information for each propagation characteristic, and related information for determination of at least one of the listed items.

Then, the control unit 960 controls to transmit reference signals for channel quality measurement. The reference signals are transmitted through at least one of the resource periods for respective propagation characteristics. According to an exemplary embodiment of the present invention, the control unit 960 may control to transmit reference signals with respective propagation characteristics through respective resource periods for respective propagation characteristics with respect to all propagation characteristics. According to another exemplary embodiment of the present invention, the control unit 960 may control to transmit reference signals with relevant propagation characteristics through resource periods for relevant propagation characteristics with respect to some propagation characteristics. In this case, the control unit 960 may repeatedly transmit the reference signal with the same propagation characteristic in different beam directions.

Also, the control unit 960 receives feedback information related to propagation characteristics from one or more terminals, and determines propagation characteristics to be applied to the one or more terminals with reference to the feedback information. In summary, the feedback information may include at least one of a CQI, an interference amount, a path loss for each beam pattern, a preferred beam pattern, a preferred beam direction, and a CQI for each preferred beam pattern or direction. If the system information includes an interference and a CQI for one or more beam patterns and only an interference for the other beam patterns, the control unit 960 may calculate CQIs for all the beam patterns by using the CQI and the interference. Also, the control unit 960 may change a propagation characteristic applied according to the state of each terminal.

In the exemplary embodiment illustrated in FIG. 9, the base station includes only one TX RF chain 930. However, according to another exemplary embodiment of the present invention, the base station may include a plurality of TX RF chains and include a digital precoder at a front end of the TX RF chains, instead of the beamforming units 940-1 and 940-2, to perform digital beamforming. In addition, according to yet another exemplary embodiment of the present invention, the base station may include both the beamforming units 940-1 and 940-2 and the digital precoder to perform hybrid beamforming. In this case, the beamforming units 940-1 and 940-2 may further perform an operation of adding signals to be transmitted through the same antennas, among the digital-beamformed signals.

Figure 10:
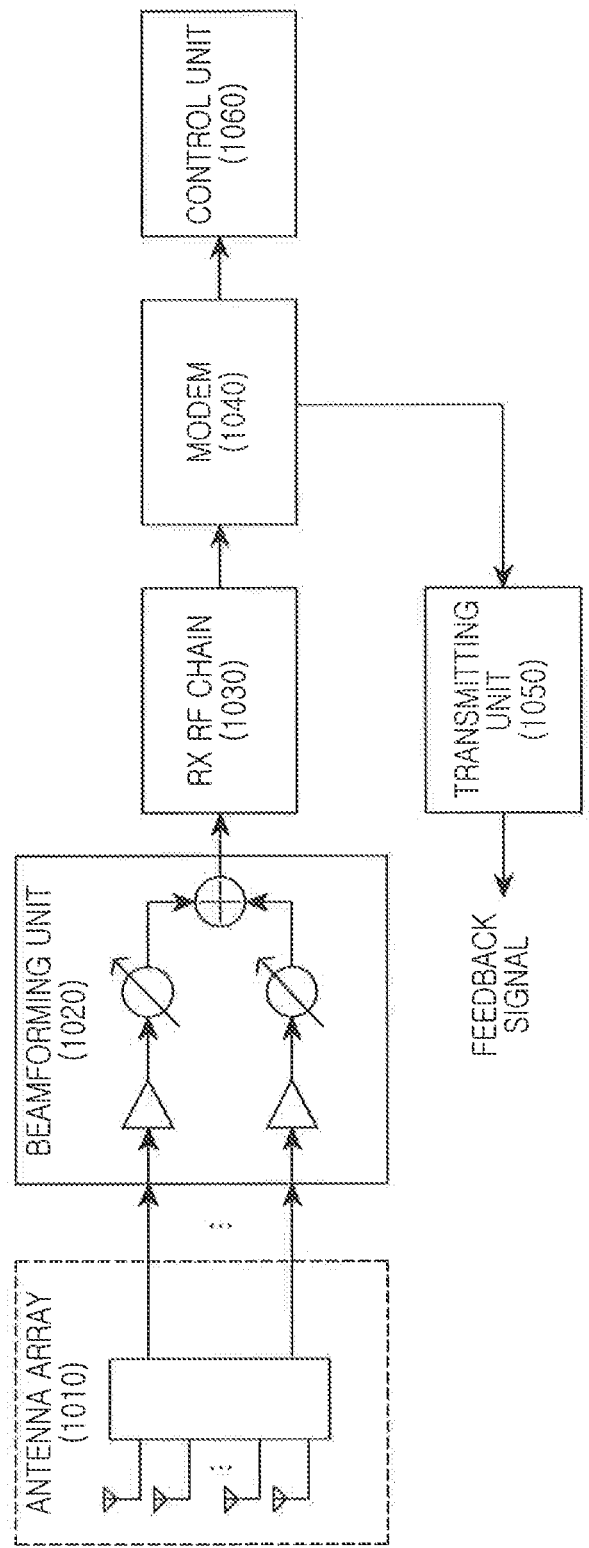
FIG. 10 is a block diagram illustrating a configuration of a terminal in a wireless communication system according to an exemplary embodiment of the present invention.

FIG. 10 illustrates a block configuration of a terminal in a wireless communication system according to an exemplary embodiment of the present invention.

Referring to FIG. 10, the terminal may include an antenna array 1010, a beamforming unit 1020, an RX RF chain 1030, a modem 1040, a transmitting unit 1050, and a control unit 1060.

The antenna array 1010 is a group of a plurality of antennas, and includes a plurality of array elements. The beamforming unit 1020 performs RX beamforming on a signal received through a plurality of antennas included in the antenna array 1010. For example, the beamforming unit 1020 includes a plurality of amplifiers, a plurality of phase shifters, and a signal adder. For example, the beamforming unit 1020 performs RX beamforming by adjusting the phases of signals received through the respective antennas and adding the same. The RX RF chain 1030 converts an RF analog RX signal into a baseband digital signal. For example, the RX RF chain 1030 may include an amplifier, a mixer, an oscillator, an Analog-to-Digital Converter (ADC), and a filter. FIG. 10 illustrates only one RX RF chain 1030. However, according to another exemplary embodiment of the present invention, the terminal may include a plurality of RX RF chains. In this case, the terminal may simultaneously form a plurality of RX beams as many as the number of RX RF chains.

The modem 1040 performs conversion between a baseband signal and a bitstream according to a physical layer standard of the system. For example, according to an OFDM scheme, in a data transmission mode, the modem 1040 generates complex symbols by encoding/modulating a TX bitstream, maps the complex symbols to subcarriers, and generates OFDM symbols by IFFT operation and CP insertion. Also, in a data reception mode, the modem 1040 divides a baseband signal received from the RX RF chain 1030 into OFDM symbols, restores signals mapped to subcarriers by FFT operation, and restores a received bitstream by demodulation and decoding.

In particular, the modem 1040 measures received signal strengths of synchronization signals transmitted from a base station. Specifically, the modem 1040 detects reference signals transmitted from the base station. Also, the modem 1040 measures a received signal strength of the detected reference signal and provides the received signal strength to the control unit 1060. Also, the modem 1040 estimates a channel quality for each beam pattern by using the reference signals. According to an exemplary embodiment of the present invention, when the reference signals are transmitted in all of the resource periods allocated for the respective propagation characteristics, the modem 1040 may measure CQIs for the respective beam patterns. On the other hand, according to another exemplary embodiment of the present invention, when the reference signals are transmitted only in one or more resource periods, the modem 1040 may measure a CQI and interference for one or more beam patterns and measure only an interference for the other beam patterns. According to yet another exemplary embodiment of the present invention, even when the reference signals are transmitted in all the resource periods, the modem 1040 may measure a CQI and interference for one or more beam patterns and measure only an interference for the other beam patterns.

The transmitting unit 1050 converts a TX signal received from the modem 1040 into an RX signal and transmits the same to the base station. Although not illustrated in the drawings, the transmitting unit 1050 may include a TX RF chain and an antenna.

The control unit 1060 controls an overall operation of the terminal. For example, the control unit 1060 generates a TX traffic packet and message and provides the same to the modem 1040, and interprets an RX traffic packet and message received from the modem 1040. In particular, the control unit 1060 controls to generate feedback information on propagation characteristics for communication with a base station supporting a plurality of propagation characteristics, and transmit the feedback information. An operation of the control unit 1060 for generating/transmitting the feedback information will be described below.

The control unit 1060 obtains information on propagation characteristics operated by a base station through system information received from the base station. For example, the system information may include at least one of information indicating a propagation characteristic operated in the base station, information indicating the number of times of transmitting a reference signal, a TX power value for each beam pattern, a maximum TX antenna gain for each beam pattern, resource allocation information for each propagation characteristic, and related information for determination of at least one of the listed items. Then, the control unit 1060 controls the modem 1040 to determine, through the system information, a resource period allocated for each beam pattern, whether a reference signal is transmitted in each resource period, and the number of times of transmitting a reference signal, and then detect a reference signal.

The control unit 1060 estimates a path loss for each beam pattern. The path loss may be estimated by using a TX power value for each beam pattern included in the system information, or by using related information for calculation of the TX power value. Also, the control unit 1060 determines a preferred beam direction. Specifically, the control unit 1060 may determine a TX beam direction applied to the reference signal with the strong RX signal strength as a preferred TX beam direction, and may determine an RX beam direction applied to the reference signal with the strong RX signal strength as a preferred RX beam direction.

The control unit 1060 generates feedback information, and transmits the feedback information to the base station through the transmitting unit 1050. For example, the feedback information may include at least one of a CQI for one or more beam patterns, an interference amount for each beam pattern, a path loss for each beam pattern, a preferred beam pattern, a preferred beam direction, and a CQI for each preferred beam pattern or direction. The feedback information may be periodically transmitted at predetermined time intervals, and information items included in the feedback information may vary. For example, the CQI and the interference amount are included, the interference amount may be fed back at longer periods than the CQI.

In the exemplary embodiment illustrated in FIG. 10, the terminal includes only one RX RF chain 1030. However, according to another exemplary embodiment of the present invention, the terminal may include a plurality of RX RF chains and include a digital postcoder at a rear end of the RX RF chains, instead of the beamforming unit 1020, to perform digital beamforming. In addition, according to yet another exemplary embodiment of the present invention, the terminal may include both the beamforming unit 1020 and the digital postcoder to perform hybrid beamforming.

Signals with various propagation characteristics are used in a wireless communication system operating based on beamforming. Thus, it is possible to transmit a signal with a propagation characteristic suitable for the characteristic of each channel operated in the system and a signal with a propagation characteristic suitable for the link/channel characteristics of a base station and a terminal. Accordingly, overhead can be reduced through transmission of a signal optimized for each channel, and the transmission efficiency of a data channel can be maximized. Consequently, overall system performance can be improved.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station in a wireless communication system, the method comprising:
   transmitting system information related to characteristics of transmitting signals;
   transmitting reference signals having the characteristics through one of a plurality of resource periods; and
   receiving feedback information regarding channel qualities for the reference signals,
   wherein each of the plurality of resource periods is respectively mapped with one of the characteristics, and
   wherein the characteristics comprise at least one of a beam pattern, polarization characteristics, antenna structure, a wave strength, corresponding antenna structure and a beamwidth.

2. The method of claim 1, wherein the system information includes at least one of information indicating the characteristics to be operated by the base station, allocation information of the resource periods, information indicating a number of times of transmitting the reference signals, a transmission (TX) power value for each of the characteristics, a maximum TX antenna gain for each of the characteristics, information indicating a beam direction, and information for determining at least one of the listed items.

3. The method of claim 1, wherein the feedback information includes at least one of a Channel Quality Indicator (CQI) for each of the characteristics, a path loss for each of the characteristics, a preferred characteristic, a preferred beam direction, a CQI for each beam direction, and an interference amount.

4. The method of claim 3, wherein the feedback information is transmitted periodically, and feedback periods for respective items included in the feedback information are different from each other.

5. The method of claim 1, wherein the feedback information includes at least one of a Channel Quality Indicator (CQI) and an interference amount for one or more characteristics among the characteristics, an interference amount for the other characteristics, a preferred characteristic, and a preferred beam direction.

6. The method of claim 5, further comprising determining the CQI for each of the characteristics by using the CQI and the interference amount for the one or more characteristics and the interference amount for the other characteristics.

7. The method of claim 1, further comprising:
transmitting reference signals having different characteristics through another one of the plurality of the resource periods.

8. The method of claim 1, further comprising:
determining the characteristics to be applied to different types of channels.

9. The method of claim 8, wherein the determining of the characteristics to be applied to different types of channels comprises determining to apply a wide-beamwidth beam pattern to a channel for transmission of a signal that is to be received by a plurality of terminals.

10. The method of claim 1, further comprising:
determining the characteristics to be applied to at least one terminal by using the feedback information.

11. The method of claim 10, wherein the determining of the characteristics to be applied to at least one terminal comprises determining, if a link quality of a terminal is equal to or higher than a threshold value, to apply a wide-beamwidth beam pattern to the terminal.

12. The method of claim 10, wherein the determining of the characteristics to be applied to the at least one terminal comprises determining, if a terminal is in a Line-of-Sight (LoS) environment, to apply a characteristic different from a characteristic of at least one different terminal to the terminal.

13. The method of claim 10, further comprising:
changing the characteristics applied to the at least one terminal.

14. The method of claim 13, wherein the changing of the characteristics applied to the at least one terminal comprises changing, if a path loss of a terminal is lower than a threshold value, a beam pattern applied to the terminal into a beam pattern with a narrower beamwidth.

15. The method of claim 13, wherein the changing of the characteristics applied to the at least one terminal comprises changing, if a path loss of a terminal increases due to an obstacle, changing a beam direction of a beam pattern applied to the terminal.

16. The method of claim 13, wherein the changing of the characteristics applied to the at least one terminal comprises changing, if a path loss of a terminal increases due to an obstacle, changing a beam pattern applied to the terminal into a beam pattern with a wider beamwidth.

17. The method of claim 13, wherein the changing of the characteristics applied to the at least one terminal comprises changing, if a path loss of a terminal increases due to an increased distance from the base station, changing a beam pattern applied to the terminal into a beam pattern with a narrower beamwidth.

18. A method for operating a terminal in a wireless communication system, the method comprising:
receiving system information including information related to characteristics of transmitting signals from a base station;
receiving reference signals having the characteristics through one of a plurality of resource periods; and
transmitting feedback information regarding channel qualities for the reference signals,
wherein each of the plurality of resource periods is respectively mapped with one of the characteristics, and
wherein the characteristics comprise at least one of a beam pattern, polarization characteristics, antenna structure, a wave strength, corresponding antenna structure and a beamwidth.

19. The method of claim 18, wherein the system information includes at least one of information indicating characteristics to be operated by the base station, allocation information of the resource periods, information indicating a number of times of transmitting the reference signals, a transmission (TX) power value for each of the characteristics, a maximum TX antenna gain for each of the characteristics, information indicating a beam direction, and information for determining at least one of the listed items.

20. The method of claim 19, further comprising:
determining a TX power value for each of the characteristics through the system information; and
estimating a path loss for each of the characteristics by using the TX power value for each of the characteristics,
wherein the feedback information includes the path loss for each of the characteristics.

21. The method of claim 18, wherein the feedback information includes at least one of a Channel Quality Indicator (CQI) for each of the characteristics, a path loss for each characteristic of the characteristics, a preferred characteristic, a preferred beam direction, a CQI for each beam direction, and an interference amount.

22. The method of claim 21, wherein the feedback information is transmitted periodically, and feedback periods for respective items included in the feedback information are different from each other.

23. The method of claim 18, wherein the feedback information includes at least one of a Channel Quality Indicator (CQI) and an interference amount for one or more characteristics among the characteristics, an interference amount for the other characteristics, a preferred characteristic, and a preferred beam direction.

24. The method of claim 18, further comprising:
receiving reference signals having different characteristics through another one of the plurality of the resource period.

25. The method of claim 18, further comprising determining a preferred beam direction by using a received signal strength of the reference signal,
wherein the feedback information includes information indicating the preferred beam direction.

26. An apparatus of a base station in a wireless communication system, the apparatus comprising:
a transmitter configured to transmit system information related to characteristics of transmitting signals, and to transmit reference signals having the characteristics through one of a plurality of resource periods; and a receiver configured to receive feedback information regarding channel qualities for the reference signals, wherein each of the plurality of resource periods is respectively mapped with one of the characteristics, and wherein the characteristics comprise at least one of a beam pattern, polarization characteristics, antenna structure, a wave strength, corresponding antenna structure and a beamwidth.

27. The apparatus of claim 26, wherein the system information includes at least one of information indicating the characteristics to be operated by the base station, allocation information of the resource periods, information indicating a number of times of transmitting the reference signals, a transmission (TX) power value for each of the characteristics, a maximum TX antenna gain for each of the characteristics, information indicating a beam direction, and information for determining at least one of the listed items.

28. The apparatus of claim 26, wherein the feedback information includes at least one of a Channel Quality Indicator (CQI) for each of the characteristics, a path loss for each of the characteristics, a preferred characteristic, a preferred beam direction, a CQI for each beam direction, and an interference amount.

29. The apparatus of claim 28, wherein the feedback information is transmitted periodically, and feedback periods for respective items included in the feedback information are different from each other.

30. The apparatus of claim 26, wherein the feedback information includes at least one of a Channel Quality Indicator (CQI) and an interference amount for one or more characteristics among the characteristics, an interference amount for the other characteristics, a preferred characteristic, and a preferred beam direction.

31. The apparatus of claim 30, further comprising:
a control unit configured to determine the CQI for each of the characteristics by using the CQI and the interference amount for the one or more characteristics and the interference amount for the other characteristics.

32. The apparatus of claim 26, wherein the transmitter is further configured to transmit reference signals having different characteristics through another one of the plurality of the resource period.

33. The apparatus of claim 26, further comprising:
a control unit configured to determine the characteristics to be applied to different types of channels.

34. The apparatus of claim 33, wherein the control unit determines to apply a wide-beamwidth beam pattern to a channel for transmission of a signal that is to be received by a plurality of terminals.

35. The apparatus of claim 26, further comprising:
a control unit configured to determine the characteristics to be applied to at least one terminal by using the feedback information.

36. The apparatus of claim 35, wherein, if a link quality of a terminal is equal to or higher than a threshold value, the control unit determines to apply a wide-beamwidth beam pattern to the terminal.

37. The apparatus of claim 35, wherein, if a terminal is in a Line-of-Sight (LoS) environment, the control unit determines to apply a characteristic different from a characteristic of at least one different terminal to the terminal.

38. The apparatus of claim 35, wherein the control unit changes the characteristics applied to the at least one terminal.

39. The apparatus of claim 38, wherein, if a path loss of a terminal is lower than a threshold value, the control unit changes a beam pattern applied to the terminal into a beam pattern with a narrower beamwidth.

40. The apparatus of claim 38, wherein, if a path loss of a terminal increases due to an obstacle, the control unit changes a beam direction of a beam pattern applied to the terminal.

41. The apparatus of claim 38, wherein, if a path loss of a terminal increases due to an obstacle, the control unit changes a beam pattern applied to the terminal into a beam pattern with a wider beamwidth.

42. The apparatus of claim 38, wherein, if a path loss of a terminal increases due to an increased distance from the base station, the control unit changes a beam pattern applied to the terminal into a beam pattern with a narrower beamwidth.

43. A terminal in a wireless communication system, the terminal comprising:
a receiver configured to receive system information related to characteristics of transmitting signals from a base station, and, to receive reference signals having the characteristics through one of a plurality of resource periods, and a transmitter configured to transmit feedback information regarding channel qualities for the reference signals, wherein each of the plurality of resource periods is respectively mapped with one of the characteristics, and wherein the characteristics comprise at least one of a beam pattern, polarization characteristics, antenna structure, a wave strength, corresponding antenna structure and a beamwidth.

44. The terminal of claim 43, wherein the system information includes at least one of information indicating the characteristics to be operated by the base station, allocation information of the resource periods, information indicating a number of times of transmitting the reference signals, a transmission (TX) power value for each of the characteristics, a maximum TX antenna gain for each of the characteristics, information indicating a beam direction, and information for determining at least one of the listed items.

45. The terminal of claim 44, further comprising:
a control unit configured to determine a TX power value for each of the characteristics through the system information and to estimate a path loss for each of the characteristics by using the TX power value for each of the characteristics, wherein the feedback information includes the path loss for each of the characteristics.

46. The terminal of claim 43, wherein the feedback information includes at least one of a Channel Quality Indicator (CQI) for each of the characteristics, a path loss for each of the characteristic, a preferred characteristic, a preferred beam direction, a CQI for each beam direction, and an interference amount.

47. The terminal of claim 46, wherein the feedback information is transmitted periodically, and feedback periods for respective items included in the feedback information are different from each other.

48. The terminal of claim 43, wherein the feedback information includes at least one of a Channel Quality Indicator (CQI) and an interference amount for one or more characteristics among the characteristics, an interference amount for the other characteristics, a preferred characteristic, and a preferred beam direction.

49. The terminal of claim 43, wherein the receiver is further configured to receive reference signals having different characteristics through another one of the plurality of the resource period.

50. The terminal of claim 43, further comprising:
a control unit configured to determine a preferred beam direction by using a received signal strength of the reference signal,
wherein the feedback information includes information indicating the preferred beam direction.

\* \* \* \* \*